Oct. 30, 1956  J. G. KREER, JR  2,769,149
SPIRALLY WOUND COMPOSITE ELECTRICAL CONDUCTOR
Filed Dec. 29, 1951  2 Sheets-Sheet 1
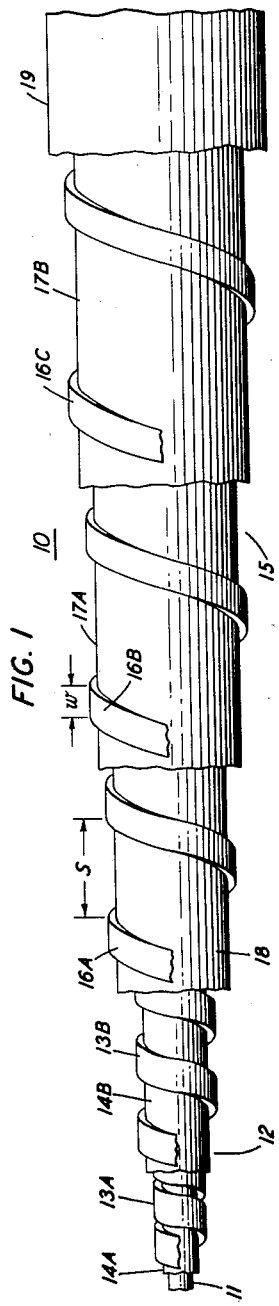
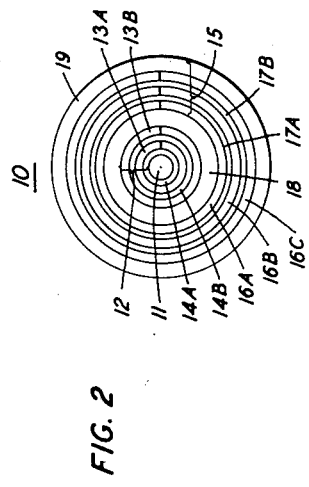
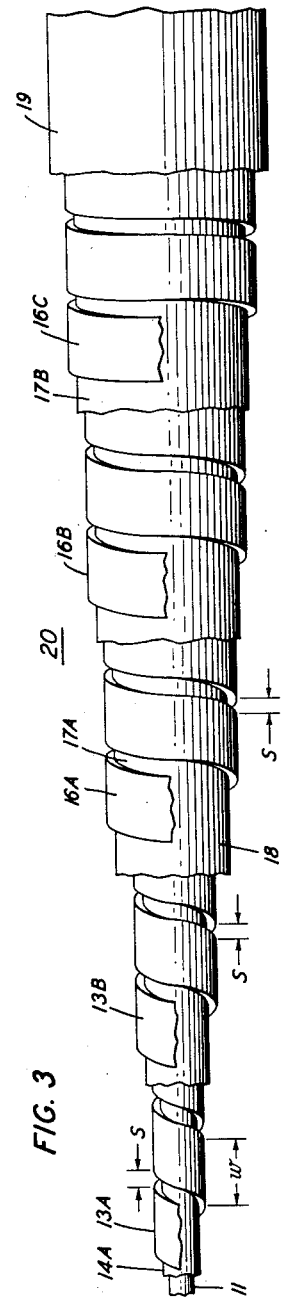
INVENTOR
J. G. KREER, JR.
BY
Hugh S. Wertz
ATTORNEY

INVENTOR
J. G. KREER, JR.
BY
ATTORNEY

United States Patent Office 2,769,149
Patented Oct. 30, 1956

2,769,149

SPIRALLY WOUND COMPOSITE ELECTRICAL CONDUCTOR

John G. Kreer, Jr., Bloomfield, N. J., assignor to Bell Telephone Laboratories, Incorporated, New York, N. Y., a corporation of New York Application December 29, 1951, Serial No. 264,040

7 Claims. (Cl. 333—96)

This invention relates to electrical conductors and more specifically to composite conductors formed of a multiplicity of conducting laminations insulated from each other.

In a copending application of A. M. Clogston, Serial No. 214,393, filed March 7, 1951, there is disclosed a number of composite conductors each comprising a multiplicity of insulated conducting elements of such number, dimensions, and disposition relative to each other and to the orientation of the electromagnetic wave being propagated therein as to achieve a more favorable distribution of current and field within the conducting material. In each of a number of specific embodiments, the composite conductor is a "stack" comprising a multiplicity of thin, coaxially arranged, metal laminations insulated from one another by thin insulating layers and arranged so that the smallest dimension of each of the laminations is in the direction perpendicular to both the direction of wave propagation and the magnetic vector. Each metal lamination is preferably many times (for example 10, 100 or even 1,000 times) smaller than the factor $\delta$ which is called one skin thickness or one skin depth. The distance $\delta$ is given by the expression:

$$\sqrt{\frac{1}{\pi f \mu \sigma}} \qquad (1)$$

where $\delta$ is expressed in meters, $f$ is the frequency in cycles per second, $\mu$ is the permeability of the metal in henries per meter, and $\sigma$ is the conductivity in mhos per meter. The factor $\delta$ measures the distance in which the current and field penetrating into a slab of the metal many times $\delta$ in thickness will decrease by one neper; i. e., their amplitude will become equal to $$\frac{1}{e} = 0.3679 \ldots$$

times their amplitude at the surface of the slab.

It is pointed out in the Clogston application that when a conductor has such a laminated structure, a wave propagated along the conductor at a velocity in the neighborhood of a certain critical value will penetrate further into the conductor (or completely through it) than it would penetrate into a solid conductor of the same material, resulting in a more uniform current distribution in the laminated conductor and consequently lower losses. The critical velocity for the type of structure just described is determined by the thickness of the metal and insulating laminae and the dielectric constant of the insulating laminae in the composite conductors. In the case of a specific embodiment in which two coaxially arranged composite conductors (stacks) are separated by an intermediate dielectric member, the critical velocity can be maintained by making the dielectric constant of the intermediate dielectric member equal to $$\epsilon_1 = \epsilon_2 \left(1 + \frac{W}{t}\right) \qquad (2)$$

where $\epsilon_1$ is the dielectric constant of the intermediate dielectric element in farads per meter, $\epsilon_2$ is the dielectric constant of the insulating material between the laminae of the conductors in farads per meter, W is the thickness of one of the metal laminae in meters and $t$ is the thickness of an insulating lamina in meters. The insulating laminae are also made very thin, and an optimum thickness for certain structures of this general type is that in which each insulating lamina is one-half the thickness of a metal lamina. It can be seen from Equation 2 that the expression $$\epsilon_2 \left(1 + \frac{W}{t}\right)$$

is actually the average transverse dielectric constant of the laminated medium. Since, as pointed out in the aforementioned Clogston application, the velocity of propagation of an electromagnetic wave in a medium is proportional to $$\frac{1}{\sqrt{\mu \epsilon}}$$

where $\mu$ represents the permeability of the medium and $\epsilon$ represents the dielectric constant, the velocity is the same in two different media if the product of $\mu\epsilon$ is the same for the two media, all else being equal. If the two media are adjacent each other, the velocity of propagation is substantially uniform throughout the cross-section of the area defined by the two media.

It is an object of this invention to improve the current distribution of composite structures of the general type just described.

In a copending application of J. G. Kreer, Jr., Serial No. 234,358, filed June 29, 1951, various structures of the "Clogston" type are disclosd in which the required velocity of wave propagation is produced by utilizing magnetic material for loading. The use of such magnetic material makes possible the utilization of dielectric materials with lower dielectric constants than those of the corresponding structures described in the above-identified Clogston application. The advantage of each of these arrangements is that it reduces the current density in the composite conductor and therefore tends to decrease the losses.

The present invention is based on the discovery that the effect of magnetic loading can be simulated without the use of magnetic materials by properly spiraling each conducting lamina. In such an arrangement, the intermediate dielectric member can be essentially air (that is some suitable dielectric foam material which has a dielectric constant only slightly more than one). This becomes very important in situations where dielectric loss is controlling.

In one embodiment of the invention each lamination is in the form of a spiraled tape, the pitch angle being maintained constant throughout the various layers. In another embodiment, the pitch angle is changed from layer to layer so that the spacing between adjacent turns of each spiral remains constant. In still another embodiment, both the pitch angle and the spacing between adjacent turns are maintained constant, the width of the tape increasing as the diameter of the lamination is increased. Each lamination can be made up of one spiral or a plurality of spirals, as desired.

The invention will be more readily understood by referring to the following description taken in connection with the accompanying drawings forming a part thereof, in which:

Fig. 1 is a longitudinal view, with portions broken away, of a coaxial composite conductor in accordance with the invention, each of the inner and outer conductors (stacks) comprising a multiplicity of insulated metal layers and the two stacks being separated by an intermediate dielectric member, the metal layers in at least one of the stacks comprising spiraled material;

Fig. 2 is an end view of the composite conductor of Fig. 1;

Fig. 3 is a longitudinal view, with portions broken away, of a modification of the arrangement of Fig. 1, the space between successive turns of each spiral in Fig. 1 being maintained constant by changing the pitch angle from layer to layer;

Figure 4:
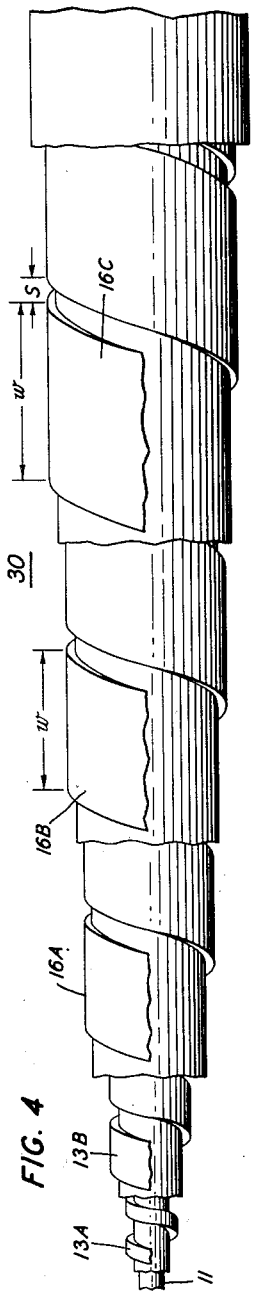
Fig. 4 is a longitudinal view, with portions broken away, of another modification of the arrangement of Fig. 1 in which both the pitch angle and the spacing between adjacent turns of each spiral are maintained constant.

With reference to the drawings, Figs. 1 and 2 show, by way of example for purposes of illustration, a conductor 10 in accordance with the invention, Fig. 1 being a longitudinal view and Fig. 2 being an end view. The conductor 10 comprises a central core 11 (which may be either of metal or dielectric material), an inner conductor or stack 12 formed of many layers of metal 13A, 13B . . . spaced by insulating material 14A, 14B . . ., an outer conductor or stack 15 formed of a multiplicity of layers of metal 16A, 16B, 16C . . . spaced by insulating material 17A, 17B . . . and separated from the inner conductor 12 by an intermediate dielectric member 18, and an outer sheath 19 of metal or other suitable shielding material. As in the structures disclosed in the above-mentioned Clogston application, each of the metal layers 13A, 13B . . ., 16A, 16B . . ., is made very thin compared to the skin depth of the conducting material being used which, for example, can be copper, silver or aluminum. The insulating layers 14A, 14B . . . and 17A, 17B . . . are also made very thin and may be of any suitable material. Examples of satisfactory insulating materials are: air, polyethylene, polystyrene, quartz, polyfoam or any other suitable foam material. Preferably, the insulating layers are of the order of one-half the thickness of each metal layer, although this is not necessarily true in all cases. The inner conductor 12 has 10 or 100 or more metal layers 13A, 13B . . ., and the outer conductor 15 has a somewhat similar number of metallic layers 16A, 16B, 16C . . ., although there need not be the same number as in the inner conductor 12. Since there are a large number of insulating and metallic layers, it makes no difference whether the first or the last layer in each stack (12 to 15) is of metal or of insulation. The dielectric member 18 is of any suitable material. If nonmagnetic, it is preferably selected so that dielectric loss in the material selected is as small as practical and $\epsilon_1$ is as small as possible where $\epsilon_1$ is the average dielectric constant of the member in farads per meter. Accordingly, a desirable material for the central dielectric member 18 is one which has a relative dielectric constant as near 1.0 as possible. Such a material can, for example, be air or an appropriate polyfoam or other foam material having a dielectric constant very little more than 1.0. In order that the phase velocity in the direction of transmission have the proper value (not necessarily the Clogston value which can be obtained from Equation 2 above) to produce the result desired, many and preferably all of the conductors 13A, 13B . . ., 16A, 16B, 16C . . ., in one or both of the stacks are fashioned in the form of a spiral, thereby increasing the inductance per unit length and making magnetic materials unnecessary. If only one stack is spiraled, it should preferably be the outer one. In the arrangement of Figs. 1 and 2, each of the spiraled conducting layers 13A, 13B . . ., 16A, 16B, 16C . . ., has the same pitch angle, that is, the angle the longitudinal axis of each tape makes with a line parallel to the axis of the composite conductor and tangent to the circumference of the insulating layer upon which the tape is wrapped is maintained constant for each layer. This has the effect of increasing the spacing S between adjacent turns of the same spiral as the radius increases from the layer 13A to the layer 16C, assuming that the width $w$ of the tape is maintained constant throughout the various layers.

Fig. 3 is a longitudinal view, with portions broken away, of a conductor 20 which is a modification of the conductor 10 shown in Figs. 1 and 2. The conductor 20 differs from the conductor 10 in that the various conducting layers 13A, 13B . . ., 16A, 16B, 16C . . . have the same spacing S throughout, the pitch angle of the various conducting layers being varied to maintain this condition. The width $w$ of the various conducting layers is also maintained constant. This arrangement has the disadvantage that the length of the outer layers is greater than that of the inner ones but for exceedingly thin layers this disadvantage is not critical.

In the conductor 30 of Fig. 4, the various conducting layers 13A, 13B . . ., 16A, 16B, 16C have been given the same pitch angle, as in the conductor 10 in Fig. 1, but the spacing S between adjacent turns of the same winding has been maintained constant by increasing the width $w$ of each layer as the diameter increases. This arrangement is the preferred one of the group including the conductors of Figs. 1, 3 and 4 since it is very desirable to maintain the pitch angle constant and at the same time it is advantageous to make the spacing S between the adjacent turns in each conducting layer as small as possible so that each layer is essentially of conducting material. Obviously, however the spacing S must have some value greater than zero since each turn must be spaced from its neighbors so that the turns will not be shorted.

Figure 5:
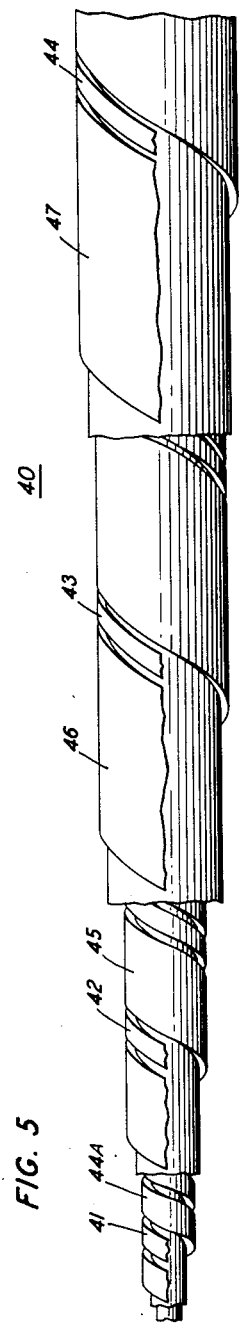
Fig. 5 is a longitudinal view, with portions broken away, of an arrangement in which each metal layer in the composite conductor is formed by two spirals.
Figure 6:
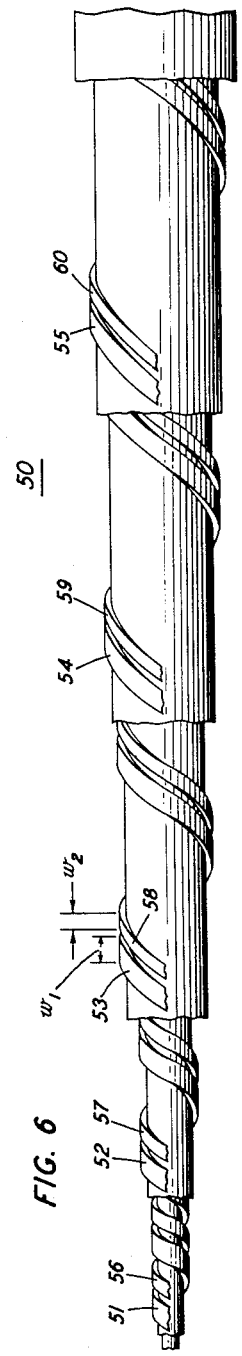
Fig. 6 is a longitudinal view, with portions broken away, of a modification of the arrangement of Fig. 5.

In each of the conductors 40 and 50 shown in Figs. 5 and 6, respectively, a plurality of spirals is provided for each layer. By way of example, in the conductor 40 the first series of spirals, designated 41, 42, 43, 44, is similar to that represented by the layers 13A, 13B . . . 16A, 16B in Fig. 1 while the second series of spirals, designated 44A, 45, 46, 47, is similar to that represented by the conducting layers 13A, 13B . . . 16A, 16B in the conductor 30 of Fig. 4. In the conductor 50 of Fig. 6, the series of spirals 51, 52, 53, 54, 55 is similar to that of the conductor 10 in Fig. 1 while the series of spirals 56, 57, 58, 59, 60 is also similar to the series of conductor spirals shown in Fig. 1, although, merely by way of example, the second series of spirals has been shown of smaller width $w_2$ than the width $w_1$ of the first series of spirals. Obviously, any desired number of spirals can be used in each layer. Also it will be appreciated that various combinations of spirals other than those shown in Figs. 5 and 6 can be provided.

Except for the fact that the conducting layers of the embodiments shown in Figs. 1 to 6, inclusive, have been made in the form of a spiral rather than a solid layer, the conductors 10 to 50, inclusive, are similar to the conductors shown in Figs. 7A and 7B in the above-identified Clogston application and the advantages applicable to this Clogston conductor are equally applicable to the embodiments of the present invention. In addition thereto, the advantages of magnetic loading, without actually using magnetic material, are obtained in the present invention. The intermediate dielectric member 18 can be a dielectric material having a very low dielectric constant, which, as pointed out above, makes it practical with available materials and techniques to keep the dielectric loss in the cable at a minimum.

An alternative modification is to utilize magnetic material in one of the manners disclosed in a copending application of J. G. Kreer, Jr., Serial No. 234,358, filed June 29, 1951, to obtain part of the total loading desired and obtain the remainder of the loading in the manner described herein.

It is to be understood that the above-described embodi-

What is claimed is:

1. A medium for the transmission of electro-magnetic waves comprising two coaxially arranged composite conductors spaced from one another, at least one composite conductor comprising a multiplicity of very thin layers of spirally wound metallic material each separated by layers of insulating material, adjacent turns of each of the spirally wound layers being separated from each other, each layer of metallic material having a thickness which is small compared to the skin depth of penetration of waves into said metallic material at the highest frequency of operation of said medium, said one composite conductor having an intrinsic velocity of propagation which is equal to the velocity of propagation of said waves in said medium.

2. A medium for the transmission of electromagnetic waves comprising two coaxially arranged composite conductors spaced from one another, at least one composite conductor comprising a multiplicity of very thin layers of spirally wound metallic material, adjacent layers being separated by insulating material, adjacent turns in each of the spirally wound layers being spaced from each other, said one composite conductor having an intrinsic velocity of propagation which is equal to the velocity of propagation of said waves in said medium.

3. A medium for the transmission of electromagnetic waves comprising two coaxially arranged composite conductors spaced from one another, the outer one of said composite conductors comprising a multiplicity of very thin layers of spirally wound metallic material, adjacent layers being separated by insulating material, adjacent turns of each of the spirally wound layers being spaced from one another, said one composite conductor having an intrinsic velocity of propagation which is equal to the velocity of propagation of said waves in said medium.

4. A medium for the transmission of electromagnetic waves comprising two coaxially arranged composite conductors spaced from one another, at least one composite conductor comprising a multiplicity of very thin layers of spirally wound metallic material, adjacent layers being separated by insulating material, adjacent turns of each of the spirally wound layers being spaced from each other and all of said spirals having the same pitch angle, said one composite conductor having an intrinsic velocity of propagation which is equal to the velocity of propagation of said waves in said medium.

5. A medium for the transmission of electromagnetic waves comprising two coaxially arranged composite conductors spaced from one another, at least one composite conductor comprising a multiplicity of very thin layers of spirally wound metallic material, adjacent layers being separated by insulating material, adjacent turns of each of the spirally wound layers being spaced from each other and all of said spirals having the same width, said one composite conductor having an intrinsic velocity of propagation which is equal to the velocity of propagation of said waves in said medium.

6. A medium for the transmission of electromagnetic waves comprising two coaxially arranged composite conductors spaced from one another, at least one composite conductor comprising a multiplicity of very thin layers of spirally wound metallic material, adjacent layers being separated by insulating material, adjacent turns of each of the spirally wound layers being spaced from each other and all of said layers having the same spacing between adjacent turns of each spiral, said one composite conductor having an intrinsic velocity of propagation which is equal to the velocity of propagation of said waves in said medium.

7. A medium for the transmission of electromagnetic waves comprising two coaxially arranged composite conductors spaced from one another, at least one composite conductor comprising a multiplicity of very thin layers, each layer comprising a multiplicity of spirally wound metallic members and adjacent layers being separated by insulating material, adjacent turns of each of the spirally wound layers being spaced from each other, said one composite conductor having an intrinsic velocity of propagation which is equal to the velocity of propagation of said waves in said medium.

References Cited in the file of this patent

UNITED STATES PATENTS

| | | |
|---|---|---|
| 61,325 | De Morat | Jan. 22, 1867 |
| 752,840 | Holmes | Feb. 23, 1904 |
| 1,701,278 | Silbermann | Feb. 5, 1929 |
| 1,903,975 | Buckley | Apr. 18, 1933 |
| 2,008,286 | Leib | July 16, 1935 |
| 2,576,163 | Weston | Nov. 27, 1951 |